United States Patent
Kitanaka

(10) Patent No.: US 7,385,371 B2
(45) Date of Patent: Jun. 10, 2008

(54) VECTOR CONTROLLER FOR INDUCTION MOTOR

(75) Inventor: Hidetoshi Kitanaka, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 53 days.

(21) Appl. No.: 10/578,474

(22) PCT Filed: Apr. 1, 2005

(86) PCT No.: PCT/JP2005/006505

§ 371 (c)(1),
(2), (4) Date: May 5, 2006

(87) PCT Pub. No.: WO2006/033180

PCT Pub. Date: Mar. 30, 2006

(65) Prior Publication Data

US 2007/0159131 A1    Jul. 12, 2007

(30) Foreign Application Priority Data

Sep. 22, 2004   (JP) .............................. 2004-274979

(51) Int. Cl.
*H02P 21/00* (2006.01)
*H02P 21/14* (2006.01)
(52) U.S. Cl. ....................... 318/727; 318/767; 318/801; 318/812
(58) Field of Classification Search .................. 318/727, 318/767, 801, 812
See application file for complete search history.

(56) References Cited

U.S. PATENT DOCUMENTS 5,629,597 A * 5/1997 Imanaka ...................... 318/805

(Continued)

FOREIGN PATENT DOCUMENTS

| JP | 2000-342000 | 12/2000 |
| JP | 2002-010412 | 1/2002 |
| JP | 2003-289700 | 10/2003 |
| JP | 2004-144658 | 5/2004 |

OTHER PUBLICATIONS

Chinese Office Action dated Jul. 20, 2007 (with English Translation).

*Primary Examiner*—Lincoln Donovan
*Assistant Examiner*—Eduardo Colon Santana
(74) *Attorney, Agent, or Firm*—Buchanan Ingersoll & Rooney PC

(57) ABSTRACT

A vector controller of an induction motor capable of correcting the set value of mutual inductance so as to match it to an actual value by additional processing on software without adding any special device. The vector controller (1) of an induction motor comprises a section (3) for determining the correction value of mutual inductance of an induction motor (15) based on the error between a torque operation value calculated using a measurement of the primary current of the induction motor (15) and a torque command value for the induction motor (15) generated at a torque command generating section, and a vector control section (2) for controlling the induction motor such that the generation torque of the induction motor (15) matches the torque command value by using the circuit constants of the induction motor (15) including the correction value of mutual inductance.

2 Claims, 4 Drawing Sheets

U.S. PATENT DOCUMENTS

| | | | |
|---|---|---|---|
| 6,611,124 B2* | 8/2003 | Ishida | 318/727 |
| 6,683,428 B2* | 1/2004 | Pavlov et al. | 318/432 |
| 2001/0026140 A1* | 10/2001 | Ishida | 318/727 |
| 2004/0138837 A1* | 7/2004 | Fujii et al. | 702/64 |
| 2006/0192521 A1* | 8/2006 | Nagata et al. | 318/807 |
| 2007/0210741 A1* | 9/2007 | Nagata et al. | 318/807 |

* cited by examiner

VECTOR CONTROLLER FOR INDUCTION MOTOR

TECHNICAL FIELD

The present invention relates to a vector controller for an induction motor, and more particularly, to such a vector controller that serves to correct an error between an initial set value and an actual value of mutual inductance.

BACKGROUND ART

In general, according to vector control, it is possible to control a magnetic flux current component and a torque current component independently from each other by separating the current of an AC electric motor into a magnetic field (magnetic flux) direction component and a torque direction component perpendicular to the magnetic field, thereby to control the generated torque instantaneously, as in the case of a DC electric motor (see, for example, a First Non-patent Document).

In a known vector control apparatus for an induction motor, the amplitude, frequency and phase of a voltage supplied to the induction motor are calculated by using a circuit constant of the induction motor. In this case, when there exists an error between a circuit constant set in the vector control apparatus for an induction motor and an actual circuit constant of the induction motor, it becomes impossible for the vector control apparatus to maintain its vector control state, so an actual torque generated by the induction motor does not coincide with a torque command value from a system side. In addition, when the torque command value changes transitionally, the torque generated by the induction motor might cause overshoot or the like so the reaction or operation of the induction motor becomes vibratory, thus resulting in the deterioration of the torque control performance.

A secondary resistance set value among circuit constants of the induction motor can be said as follows. That is, a secondary circuit (rotor) is generally made of a copper alloy, so the actual resistance value thereof changes in accordance with the operating condition of the induction motor and a temperature change in the ambient atmosphere. Thus, there will be caused an error between the secondary resistance set value set in the vector control apparatus of the induction motor and the actual resistance value, thereby influencing the torque control performance. Accordingly, a construction or arrangement to correct such an error between the set value and the actual value is employed in many cases (see, for example, a First Patent Document).

Moreover, a mutual inductance as one of induction motor constants changes to a limited extent due to a temperature change, but an error or difference between the set value and the actual value thereof provides an influence on the steady-state torque characteristic of the induction motor.

In cases where the set value contains an error in a sense larger than the actual value, the torque generated by the induction motor becomes smaller than the torque command value, whereas in case where the set value contains an error in a sense smaller than the actual value, the torque generated by the induction motor becomes larger than the torque command value.

For example, with a vector control apparatus for an electric railway vehicle, if there is such a torque error, a problem will arise that the acceleration and deceleration of the vehicle can not be controlled in a manner as intended by an operator. Since the torque control performance is influenced in this manner, it is necessary to make the set value and the actual value coincide with each other as much as possible.

Accordingly, when the mutual inductance can be measured from a primary current of the induction motor by running the induction motor under no load, the measured value can be used as the set value.

However, actual measurements are difficult in inductance motors of built-in use in which a no-load condition can not be created, or in large-scale induction motors for installation on vehicles. Thus, in such cases, a design calculation value is adopted as the set value of the mutual inductance, so there will be an error or difference between the set value and the actual value of the mutual inductance. As a result of such a difference, the torque output of such an inductance motor does not coincide with the torque command value thereof, generating an error therebetween.

Further, much consideration is not given to the correction of the set value of the mutual inductance.

[First Non-Patent Document] "Vector Control of AC Motor" by Yoshitaka Nakano, published by Nikkan Kogyo Shinbun Co., on Mar. 29, 1996

[First Patent Document] Japanese Patent Application Raid-Open No. H06-38574

DISCLOSURE OF THE INVENTION

Problems to be Solved by the Invention

In the known vector control apparatuses for induction motors, there has been a problem that in the case of the presence of an error or difference between the set value and the actual value of the mutual inductance, a torque generated by an induction motor does not coincide with a torque command value thereof.

Means for Solving the Problems

A vector control apparatus for a conduction motor according to the present invention includes a mutual inductance correction section that obtains a correction value of a mutual inductance of the induction motor based on an error between a torque calculation value calculated by using a measured value of a primary current of the induction motor and a torque command value to the induction motor generated by a torque command generation section, and a vector control section that controls the induction motor by using a circuit constant of the induction motor including the correction value of the mutual inductance in such a manner that a torque generated by the induction motor coincides with the torque command value.

Effects of Invention

According to this vector control apparatus for an induction motor, the actual torque generated by the induction motor can be made to coincide with the torque command value by correcting the mutual inductance set value based on the output result of the mutual inductance correction section thereby to provide a new mutual inductance initial set value.

BEST MODE FOR CARRYING OUT THE INVENTION

The present invention is intended to obviate the problem as referred to above, and has for its object to provide a vector control apparatus for an induction motor which is capable of correcting a set value of a mutual inductance so as to match an actual value thereof by the addition of software processing without the addition of any particular device.

Embodiment 1

Hereinafter, reference will be made to a vector control apparatus for a conduction motor according to a first embodiment of the present invention while referring to the accompanying drawings.

It is to be note that the present invention should be carried out simultaneously with the correction of a secondary resistance value, but the explanation and illustration of the correction of the secondary resistance value are omitted as being well-known, and only the correction of a mutual inductance will be described herein.

Figure 1:
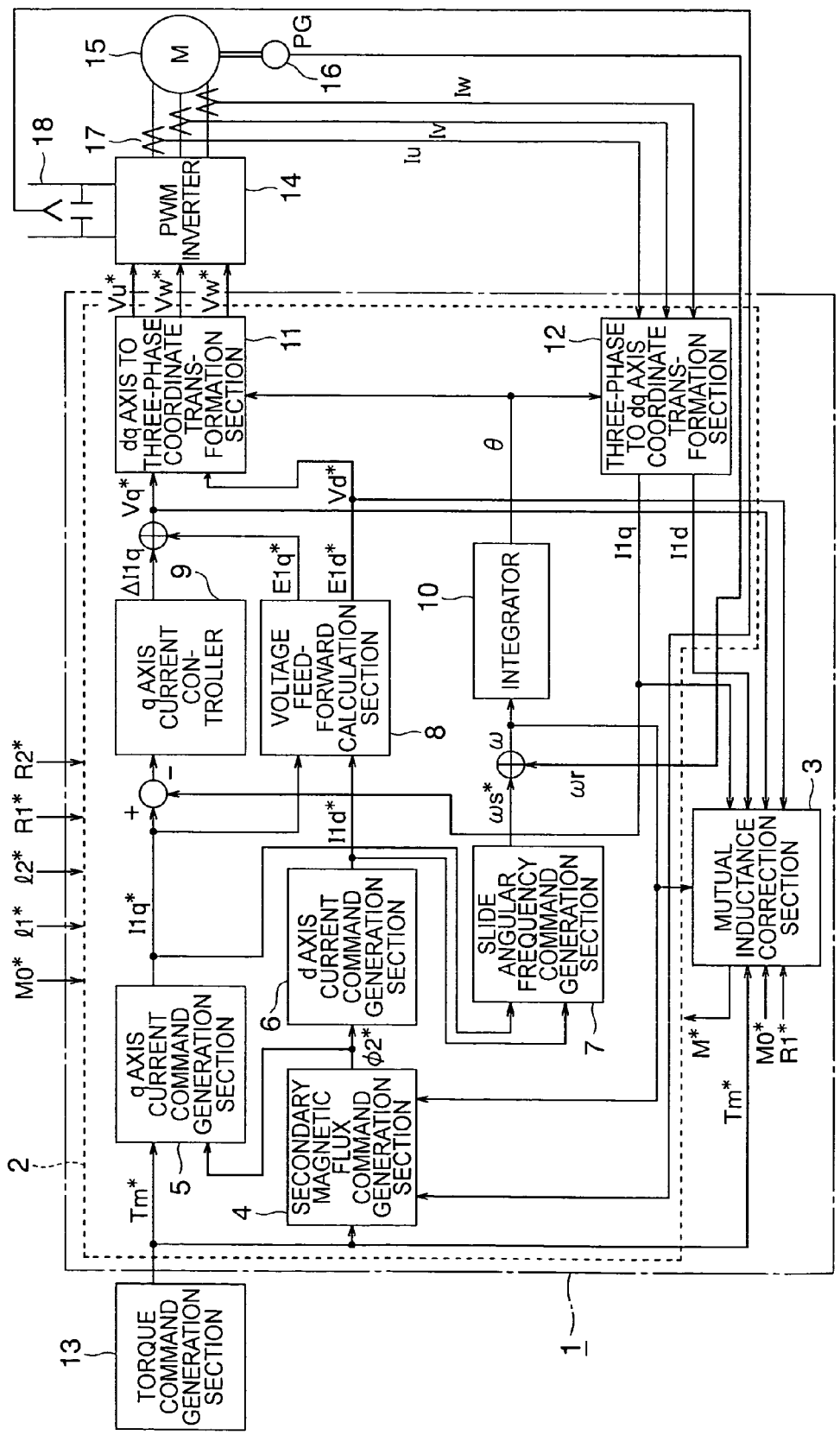
FIG. 1 is a block diagram showing an example of a vector control apparatus with its peripheral equipment configuration according to a first embodiment of the present invention (EMBODIMENT 1).

FIG. 1 is a block diagram that shows the vector control apparatus for an induction motor together with its peripheral equipment configuration according to the first embodiment of the present invention. Here, note that a mutual inductance correction section according to the present invention can be applied to a general vector control system, but herein is illustrated a vector control apparatus for an electric railway vehicle as an example of such a general vector control system.

Figure 2:
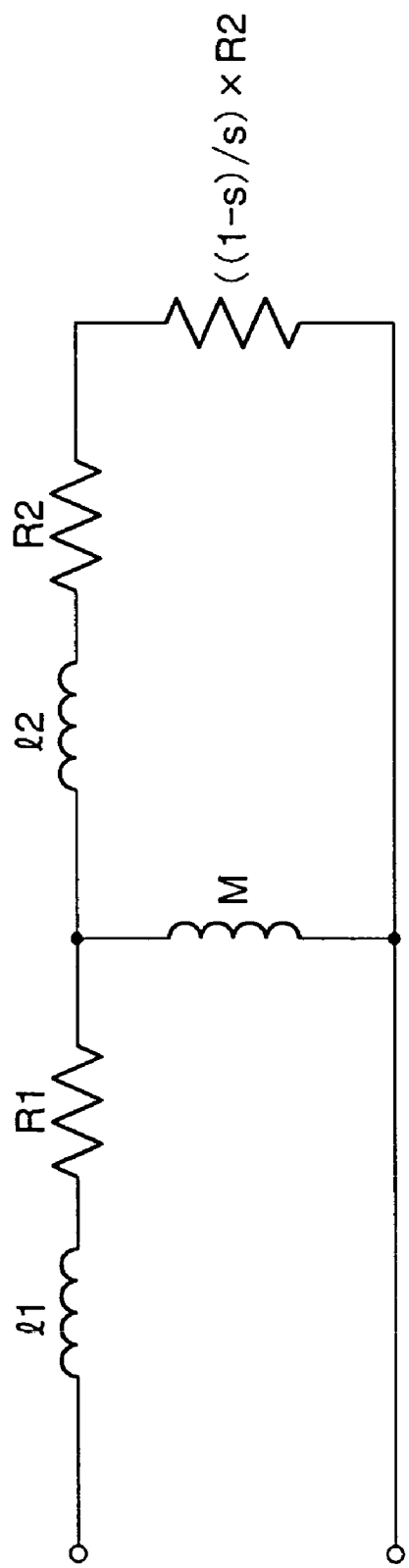
FIG. 2 is a circuit diagram showing an equivalent circuit of an induction motor that is controlled by the vector control apparatus according to the first embodiment of the present invention (EMBODIMENT 1).

FIG. 2 is a circuit diagram that shows an equivalent circuit of an induction motor (of T type and one phase) which is controlled by the vector control apparatus according to the first embodiment of the present invention.

In FIGS. 1 and 2, the vector control apparatus 1 for an induction motor (hereinafter abbreviated as a "vector control apparatus") includes a vector control section 2 that serves to vector controlling an induction motor 15, and a mutual inductance correction section 3 that serves to obtain a correction value of the mutual inductance of the induction motor 15 by using the circuit constant of the induction motor 15. In addition, the vector control section 2 includes a secondary magnetic flux command generation section 4, a q axis current command generation section 5, a d axis current command generation section 6, a slide angular frequency command generation section 7, a voltage feedforward calculation section 8, a q axis current controller 9, an integrator 10, a dq axis to three-phase coordinate transformation section 11, and a three-phase to dq axis coordinate transformation section 12.

An initial set value M0* of the mutual inductance, a primary leakage inductance set value I1*, a secondary leakage inductance set value I2*, a primary resistance set value R1*, and a secondary resistance set value R2* are provided to the vector control section 2 as set values based on the circuit constant of the induction motor 15.

Also, a torque command value Tm* is input from a torque command generation section 13, which is a host system of the vector control apparatus 1, to the vector control section 2 and the mutual inductance correction section 3.

Three-phase output voltage commands Vu*, Vv*, and Vw* output from the vector control section 2 are input to a PWM inverter 14, and an output from the PWM inverter 14 is input to the induction motor 15.

The set value of a master controller (not shown), which is installed on a driver's cab for setting the acceleration and deceleration of a train, is input to the torque command generation section 13, and a torque command value Tm* generated therein is input to the vector control apparatus 1. The secondary magnetic flux command generation section 4 outputs a secondary magnetic flux command $\phi 2^*$, which is applied to the induction motor 15 and which is calculated from the torque command value Tm* input from the torque command generation section 13, an output angular frequency $\omega$ (to be described later) of the PWM inverter 14 and a voltage value input from a DC power supply 18 to the PWM inverter 14. The d axis current command generation section 6 and the q axis current command generation section 5 calculate a d axis (excitation component) current command I1d* and a q axis (torque component) current command I1q*, respectively, from the torque command value Tm* and the secondary magnetic flux command $\phi 2^*$ according to the following expressions (1) and (2).

Here, in the expressions (1) and (2), M* (to be described later) is a corrected value obtained by correcting the initial set value M0* of the mutual inductance, and L2*(=M*+I2*) is a secondary inductance.

$$I1d^* = \phi 2^*/M^* + L2^*/(M^* \times \phi 2^*) \times s\phi 2 \qquad (1)$$

$$I1q^* = (Tm^*/(\phi 2^* \times PP)) \times (L2^*/M^*) \qquad (2)$$

where s represents a differential operator, and PP represents the number of pole pairs of the induction motor 15.

The slide angular frequency command generation section 7 calculates a slide angular frequency command $\omega s^*$ to be supplied to the induction motor 15 based on the d axis current command I1d*, the q axis current command I1q* and the circuit constant of the induction motor 15 according to the following expression (3).

$$\omega s^* = (I1q^*/I1d^*) \times (R2^*/L2^*) \qquad (3)$$

The output angular frequency $\omega$ (=$\omega r + \omega s^*$) of the PWM inverter 14, which is obtained by adding an electric motor rotational angular frequency $\omega r$ in the form of an output of the speed sensor 16 mounted on an end of a rotational shaft of the induction motor 15 to the slide angular frequency command $\omega s^*$ calculated from the expression (3), is integrated by the integrator 10 and input to the dq axis to three-phase coordinate transformation section 11 and the three-phase to dq axis coordinate transformation section 12 as a phase angle $\theta$ for coordinate transformation.

In the voltage feedforward calculation section 8, voltages E1d* and E1q* to be supplied to the induction motor 15 are calculated from the d axis current command I1d*, the q axis current command I1q* and the circuit constant of the induction motor 15 according to the following expressions (4) and (5).

Here, in the expressions (4) and (5), σ represents a leakage factor that is defined by $σ=1-M^{*}/(L1^{*}×L2^{*})$, and $L1^{*}$ ($=M^{*}+l1^{*}$) represents a primary inductance.

$$E1d^{*}=(sL1^{*}×σ+R1^{*})×I1d^{*}-ωL1^{*}×σ×I1q^{*}+(M^{*}/L2^{*})×sϕ2^{*} \quad (4)$$

$$E1q^{*}=(sL1^{*}×σ+R1^{*})×I1q^{*}+ωL1^{*}×σ×I1d^{*}+(ω×M^{*})/L2^{*}×ϕ2^{*}) \quad (5)$$

In the q axis current controller 9, a deviation between the q axis current command $I1q^{*}$ and the q axis current detected value $I1q$ is taken, as shown in the following expression (6), and the deviation is amplified by a proportional-plus-integral controller, and is output therefrom as a q axis current error $ΔI1q$.

$$ΔI1q=(K1+K2/s)×(I1q^{*}-I1q) \quad (6)$$

Here, in the expression (6), K1 represents a proportional gain, and K2 represents an integral gain.

Here, the q axis current detected value $I1q$ is a value that is obtained by converting the output of the PWM inverter 14 into a current on a dq axis by means of a coordinate transformation section expressed by the following expression (7) with the use of detection currents IU, IV, IW detected by a current sensor 17.

$$\begin{pmatrix} I1q \\ I1d \end{pmatrix} = \sqrt{\frac{2}{3}} \begin{pmatrix} \cosθ & \cos\left(θ-\frac{2}{3}π\right) & \cos\left(θ+\frac{2}{3}π\right) \\ -\sinθ & -\sin\left(θ-\frac{2}{3}π\right) & -\sin\left(θ+\frac{2}{3}π\right) \end{pmatrix} \cdot \begin{pmatrix} IU \\ IV \\ IW \end{pmatrix} \quad (7)$$

The output of the voltage feedforward calculation section 8 is output as a d axis output voltage command $Vq^{*}$ for the d axis, as shown in the following expressions (8) and (9).

Regarding the q axis, since the voltage $E1q^{*}$ is obtained through feedforward and hence contains an error with respect to an optimal value, an actual current of the induction motor 15 does not become the one as intended or instructed by the q axis current command $I1q^{*}$ when the induction motor 15 is driven by a q axis output voltage command that is calculated by using the voltage $E1q^{*}$ containing this error. Accordingly, in order to correct the error contained in the voltage $E1q^{*}$, the q axis current error $ΔI1q$ containing information on a deviation between the q axis current detected value $I1q$ and the q axis current command $I1q^{*}$ is added to the output of the voltage feedforward calculation section 8, and the value thus obtained is output as the q axis output voltage command $Vq^{*}$.

$$Vd^{*}=E1d^{*} \quad (8)$$

$$Vq^{*}=E1q^{*}+ΔI1q \quad (9)$$

Figure 3:
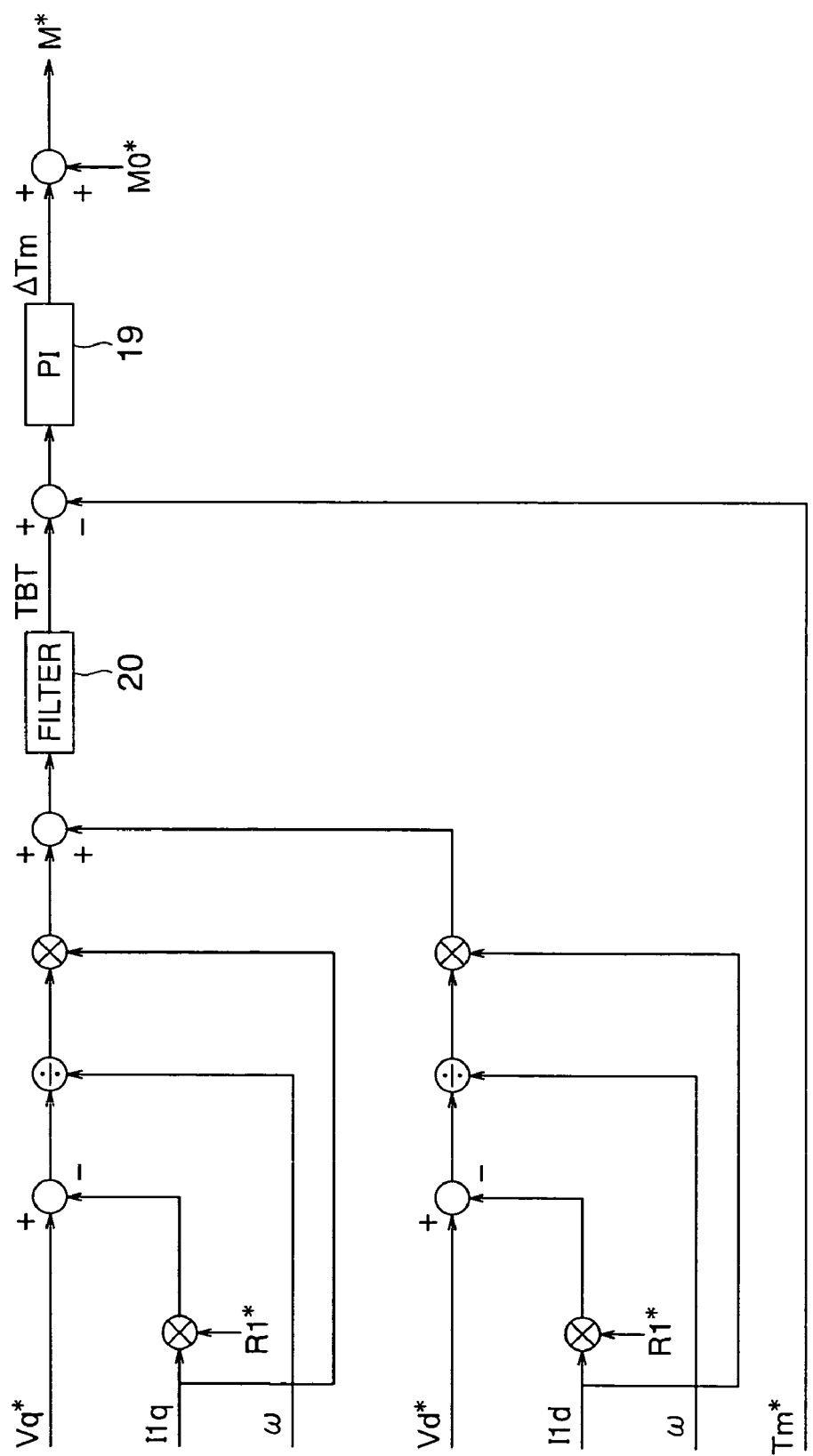
FIG. 3 is a view showing the construction of a mutual inductance compensation section of the vector control apparatus according to the first embodiment of the present invention (EMBODIMENT 1).

FIG. 3 is a view that shows the construction of the mutual inductance correction section 3 of the vector control apparatus according to the first embodiment of the present invention. The error or difference of the initial set value and the actual value of the mutual inductance generates calculation errors in the expressions (1) through (5) including the mutual inductance, thus resulting in the appearance of an error in the generated torque. Accordingly, the mutual inductance is corrected by using an error between a torque calculation value TBT and the torque command value $Tm^{*}$.

The initial set value $M0^{*}$ of the mutual inductance and the primary resistance set value $R1^{*}$ are provided to the mutual inductance correction section 3 as the set values based on the circuit constant of the induction motor 15.

In addition, input to the mutual inductance correction section 3 are dq axis output voltage commands $Vq^{*}$, $Vd^{*}$ that are obtained from the circuit constant of the induction motor 15 set in the vector control section 2, the output angular frequency ω of the PWM inverter 14 that is obtained by adding the electric motor rotational angular frequency ωr detected from the induction motor 15 to the slide angular frequency command $ωs^{*}$ obtained from the circuit constant of the induction motor 15 similarly set in the vector control section 2, dq axis currents $I1q$, $I1d$ that is obtained by converting the detection currents IU, IV, IW detected by the current sensor 17 mounted on the induction motor 15, and the torque command value $Tm^{*}$ that is input from the torque command generation section 13 to the vector control section 2.

In the mutual inductance correction section 3, the torque calculation value TBT is calculated according to the following expression (10). Regarding the calculation of the torque calculation value TBT, the expression (10) is transformed not to contain the mutual inductance therein, so even in case where there is a deviation or difference between the initial set value $M0^{*}$ and the actual value M of the mutual inductance, the torque calculation value TBT can be calculated according to the expression (10) without any influence therefrom.

$$TBT=(vq^{*}-I1q×R1^{*})/ω×I1q+(Vd^{*}-I1d×R1^{*})/ω×I1d \quad (10)$$

Here, an error between the torque calculation value TBT and the torque command value $Tm^{*}$ is passed to the proportional-plus-integral controller (PI) 19, and calculated therein according to the following expression (11). Subsequently, the correction value $M^{*}$ of the mutual inductance is obtained by adding the calculation result $ΔTm$ to the initial set value of the mutual inductance $M0^{*}$, and the correction value $M^{*}$ thus obtained is input to the vector control section 2.

$$ΔTm=(K3+K4/s)×(TBT-Tm^{*}) \quad (11)$$

Here, in the expression (11), K3 represents a proportional gain, and K4 represents an integral gain.

A correction rule for the correction value $M^{*}$ of the mutual inductance is that when the torque calculation value TBT>the torque command value $Tm^{*}$, the correction value $M^{*}$ is obtained by correcting the mutual inductance so as to be larger than the initial set value $M0^{*}$ of the mutual inductance, whereas when the torque calculation value TBT<the torque command value $Tm^{*}$, the correction value $M^{*}$ is obtained by correcting the mutual inductance so as to be smaller than the initial set value $M0^{*}$ of the mutual inductance.

Here, note that the torque calculation value TBT is used after being subjected to averaging processing of the filter 20 so as to exclude a slight variation of the torque and external perturbations from the calculation result.

Moreover, since terms containing ω become small when the rotational speed of the induction motor 15 is low, as indicated by the expressions (4) and (5), so the term $(sL1^{*}×σ+R1^{*})$ becomes relatively large. Here, the primary resistance of the induction motor 15 changes in accordance with a temperature change due to the operating condition thereof as in the case of the above-mentioned secondary resistance thereof. As a result, an accurate torque can not be calculated according to the expression (10) because of an error between the primary resistance set value $R1^{*}$ and the actual value in the torque calculation value TBT that is calculated according to the expression (10) by using the voltages $E1d$, $E1q$ calculated by the expressions (4) and (5). This becomes remarkable particularly in case where the rotational speed of the induction motor 15 is low.

Accordingly, it is preferable that the correction value M* be obtained by correcting the initial set value M0* of the mutual inductance of the present invention in a range where the rotational speed of the induction motor 15 rises to a certain speed in which the error between the primary resistance set value R1* and the actual value can be ignored.

Figure 4A:
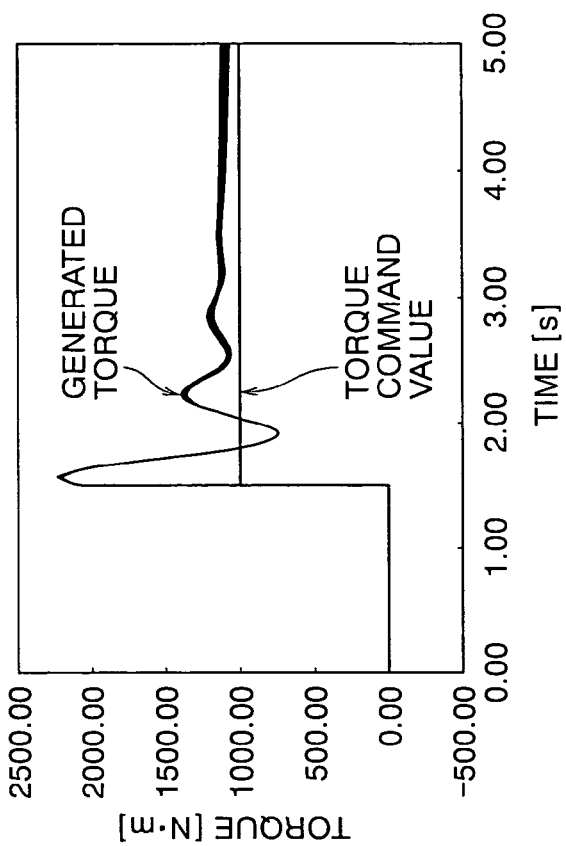
FIGS. 4A and 4B are waveform examples that is are obtained by performing response simulation of a generated torque Tm with respect to a torque command value Tm* in the vector control apparatus according to the first embodiment of the present invention.
Figure 4B:
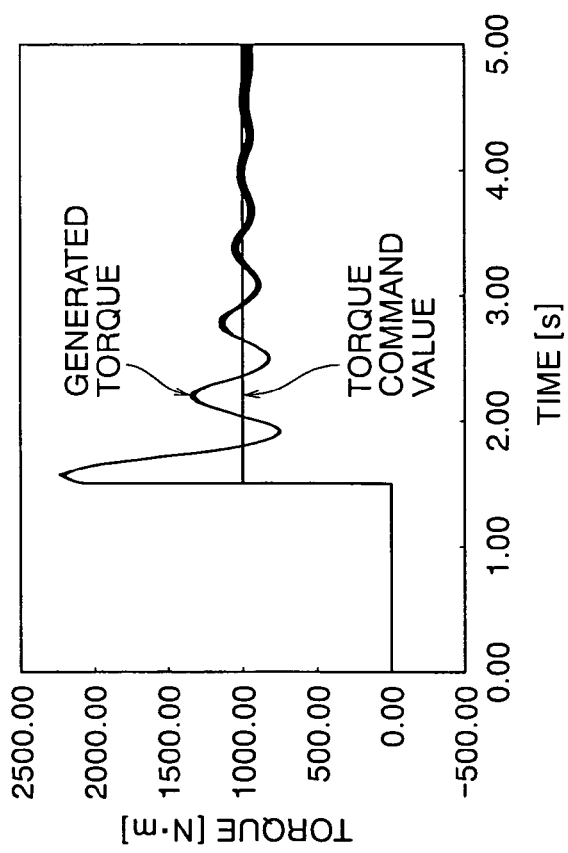

FIGS. 4A and 4B show waveform examples in which the response simulation of the generated torque Tm was carried out with respect to the torque command value Tm* in the vector control apparatus according to the first embodiment of the present invention. Here, note that the generated torque Tm is a torque which is generated by the induction motor in a simulation model calculated by using the circuit constant, the terminal voltage and the current of the induction motor.

The initial set value M0* of the mutual inductance is set to 0.5 times the actual value M. The torque command value Tm* is caused to change stepwise from 0 [N·m] to 1,000 [N·m] for a period of time of 1.5 s.

This corresponds to rising the torque of the induction motor 15 from a state of zero to a rating of 100% in a stepwise manner. FIG. 4(a) shows a response waveform in the case of using the vector control apparatus 1 according to the first embodiment of the present invention. FIG. 4(b) shows a response waveform according to a known method. According to the first embodiment of the present invention, an error or deviation of the torque command value Tm* in the steady state near at times of 4 s to 5 s becomes small, as shown in FIG. 4(a).

As described above, in the vector control apparatus 1 according to the first embodiment of the present invention, by generating the correction value M* based on the error or difference between the torque command value Tm* and the generated torque Tm, the torque command value and the actually generated torque of the induction motor 15 can be made to coincide with each other, thus making it possible to perform precise control.

Although in the foregoing description, reference has been made, as an example, to the case where the present invention is applied to the vector control apparatus for an electric railway vehicle, the invention is also applicable to vector control apparatuses for other industrial application uses. In addition, although in FIG. 1, the invention is applied to the form of the vector control apparatus of a control voltage type, it can be similarly applied to a vector control apparatus of a control current type. Further, although in FIG. 1, the speed of the induction motor 15 is detected by the use of the velocity sensor 16, the invention can also be applied to a speed sensorless vector control apparatus that detects a speed by calculation estimation or the like.

The invention claimed is:

1. A vector control apparatus for an induction motor characterized by comprising:

a mutual inductance correction section that obtains a correction value of a mutual inductance of said induction motor based on an error between a torque calculation value calculated by using a measured value of a primary current of said induction motor and a torque command value to said induction motor generated by a torque command generation section; and a vector control section that controls said induction motor by using a circuit constant of said induction motor including said correction value of said mutual inductance in such a manner that a torque generated by said induction motor coincides with said torque command value, wherein said circuit constant set in said vector control section includes a primary resistance set value, said vector control section obtains a voltage command value and a slide angular frequency command value from said circuit constant, and said mutual inductance correction section generates said correction value of said mutual inductance by correcting said initial set value of said mutual inductance based on a correction value calculated by using said voltage command value, an output angular frequency of an inverter obtained by adding a measured value of an electric motor rotational angular frequency of said induction motor to said slide angular frequency command value, said primary resistance set value, said measured value of said primary current and said torque command value.

2. The vector control apparatus for an induction motor as set forth in claim 1, characterized in that wherein said circuit constant includes a secondary resistance set value; and said vector control apparatus further comprises a secondary resistance compensation section that corrects said secondary resistance set value.

* * * * *